June 28, 1927.
J. C. DAY
1,633,725
BUTTON RECEPTACLE
Filed Nov. 23, 1926
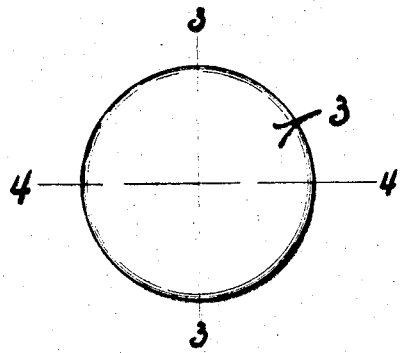
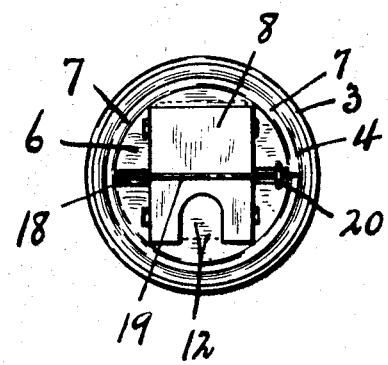
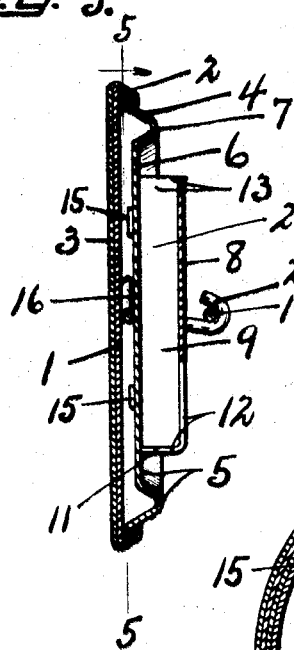
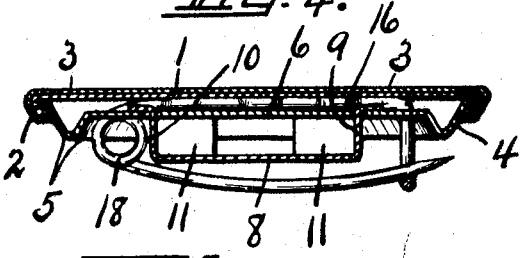
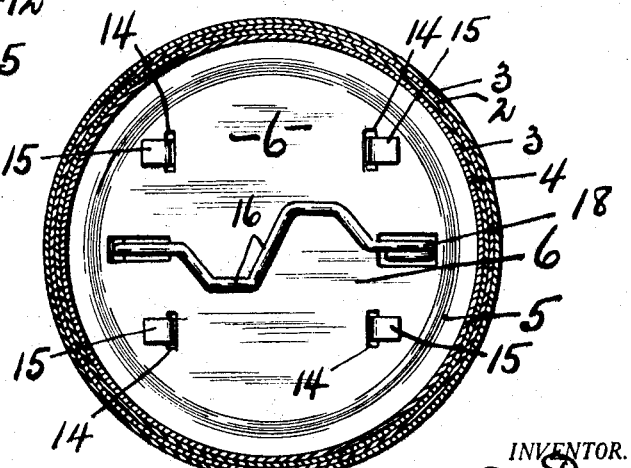
INVENTOR.
James C. Day
BY Linison Thompson
ATTORNEYS.
WITNESS Patented June 28, 1927.

1,633,725

UNITED STATES PATENT OFFICE.

JAMES C. DAY, OF SOUTH ORANGE, NEW JERSEY, ASSIGNOR TO THE WHITEHEAD & HOAG COMPANY, OF NEWARK, NEW JERSEY, A CORPORATION OF NEW JERSEY.

BUTTON RECEPTACLE.

Application filed November 23, 1926. Serial No. 150,219.

This invention relates to a new button receptacle.

The main object of the invention is the production of a button receptacle in which the button is designed to carry on its front face indicia constituting it a hunting or fishing license button, while the receptacle at the rear of the button is designed to contain the usual paper hunting, fishing or other license in folded form.

A further object resides in the provision of a comparatively rigid structure and from the recess of which the hunting or other license will be readily and easily removed.

Other objects and advantages relates to the details of the structure and the parts thereof, all as will more fully appear from the following description taken in connection with the accompanying drawing, in which:—

Figure 1 is a front view of the button receptacle.

Figure 2 is a rear view of the button receptacle.

Figures 3 and 4 are sections taken on lines 3—3 and 4—4 respectively, Figure 1.

Figure 5 is a sectional view on line 5—5, Figure 3.

The structure as shown comprises a front plate —1— having its edge —2— bent rearwardly and inwardly, and the front plate is adapted to be covered by a celluloid or other sheet —3— of suitable material adapted to contain the desired indicia, as for instance, the usual subject-matter contained upon a hunting, fishing or other license button.

The edge of the celluloid sheet is folded around the inwardly turned edge of the front plate —2—, and is confined between the edge —2— and the outer edge —4— of a rear plate, which in this structure takes the place of the usual collect.

This rear plate in the form shown comprises a substantially flat central portion —6— and the plate is formed with a rearwardly extending bead —7— at the outer edge of the central portion —6— so that in fact the rear plate is of dished form providing a sunken chamber in which the receptacle is positioned in a manner to project only a slight distance, if at all, beyond the rear edge of the bead —7—.

This receptacle is formed preferably by means of a single piece of sheet-metal so bent or shaped as to consist of a rear wall —8—, two side walls —9— and —10— respectively, one end wall —11—, the continuity of which is interrupted by cutting away a portion of the end wall, which cutaway portion in conjuction with a cut-out adjoining portion of the rear wall —8— provides a thumb opening —12— which permits an operator to push anything contained in the receptacle part way out from this open end —13— of the receptacle.

In this illustration, the substantially flat central portion —6— of the back-plate —5— is formed with four spaced slots —14— and each of the side walls —9— and —10— is formed with a pair of spaced tongues —15— which are projected through respective slots and then bent into contact with the inner surface of the central portion —6— to rigidly secure the receptacle member to the back plate.

Means is provided for securing the button receptacle to a garment or similar article in the form of a pin which has an oppositely deflected portion —16— forward of the rear plate —5— and lying flat against the rear plate with its opposite ends extended through slots —17— in the plate —5—, one of said ends being formed in a coil —18— from which the pin portion —19— extends to engage a loop —20— formed upon the opposite end.

The pin portion —19— extends across the rear wall —8— at the rear of the wall.

It will be apparent that the front surface of the button is provided for the reception of suitable indicia, for instance, to constitute the same a hunting license button, and that the paper license itself may be folded so as to fit within the chamber —21— in the receptacle at the rear of the button. When properly folded the license can be shoved in from the open end —12— and the bead —7— will maintain the license in place against accidental displacement, and when it is desired to remove the license, it is only necessary for the operator to push upon the rear portion of the license through the thumb opening —12— to push it partially from the chamber —21— where it may be easily grasped for removal.

Altho I have shown and described a specific structure as constituting a perhaps preferred embodiment of the invention, I do not desire to restrict myself to the details of the same, as various changes and modifications may be made within the scope of the appended claim.

I claim:

A button comprising a front plate and a rear plate having a dished central portion, and an open-ended receptacle positioned in the dished central portion, the edge of the dished central portion extending outwardly to form a partial closure of the open end of the receptacle.

In witness whereof I have hereunto set my hand this 30th day of October 1926.

JAMES C. DAY.